Sept. 26, 1967 W. S. CHIPPING 3,344,236

MOBILE TELEPHONE INSTRUMENT

Filed March 24, 1964 4 Sheets-Sheet 1

Sept. 26, 1967 W. S. CHIPPING 3,344,236

MOBILE TELEPHONE INSTRUMENT

Filed March 24, 1964 4 Sheets-Sheet 3

Sept. 26, 1967 W. S. CHIPPING 3,344,236

MOBILE TELEPHONE INSTRUMENT

Filed March 24, 1964 4 Sheets-Sheet 4

United States Patent Office 3,344,236

Patented Sept. 26, 1967

3,344,236

MOBILE TELEPHONE INSTRUMENT

William S. Chipping, Boucherville, Quebec, Canada, assignor to Northern Electric Company Limited, Montreal, Quebec, Canada Filed Mar. 24, 1964, Ser. No. 354,356

6 Claims. (Cl. 179—100)

This invention relates to mobile telephone instrument for securing at a convenient location in an automobile or like vehicle, and in its broadest form comprises a tubular handset holder, means for mounting said holder in the vehicle in a position to extend downwardly and rearwardly away from a user seated in the automobile, and a conventional handset snuggly housed in the holder at a location for ready grasping of its microphone end by the user. In this way the handset can be readily withdrawn from the holder by movement towards the user in the direction of the longitudinal extent of the handset.

Preferably, the handset is housed in the holder in upright orientation, that is with its two ends below the arched portion interconnecting them. To hold the handset snuggly against accidental dislodgment, the holder will preferably be gently upwardly convexly curved to conform generally to the curvature of the handset. In addition, and as a further advantageous feature, the lower inner surface of the holder can include a hump situated intermediate the two ends of the holder, this hump acting to accentuate the downward and rearward slope of the inner end of the holder, thus further decreasing any chance of the handset being dislodged accidentally.

A casing containing the necessary transmitting/receiving telephone equipment will also be provided. The handset holder may be secured to such casing, the resulting combination then be secured as a unity to the vehicle, conveniently beneath the dashboard thereof. Alternatively, the handset holder and casing can be separately mounted in different locations in the vehicle. In either event, a suitable cable connection will extend from the casing to the handset, either directly, or, when these parts are mounted remote from each other, via the holder. The cable connections will also preferably connect the equipment in the casing to a switch at the rear of the holder, which switch is located to be operated by the handset when the latter is moved in and out of the holder.

Two embodiments of the invention are illustrated by way of example in the accompanying drawings.

Figure 1:
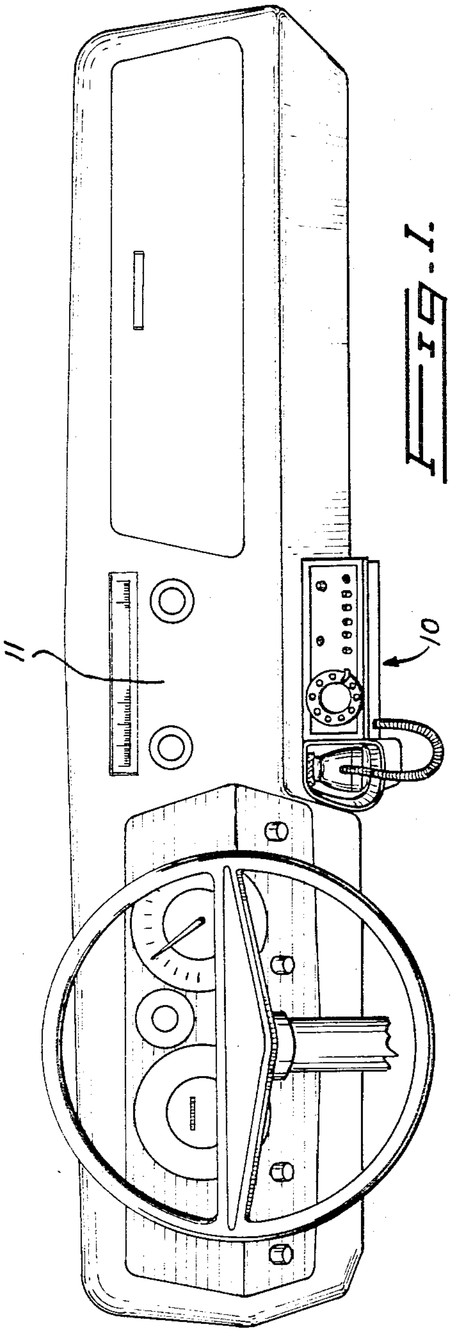
FIGURE 1 is a front view of an automobile dash board showing a telephone unit constructed in accordance with the present invention mounted thereon.
Figure 2:
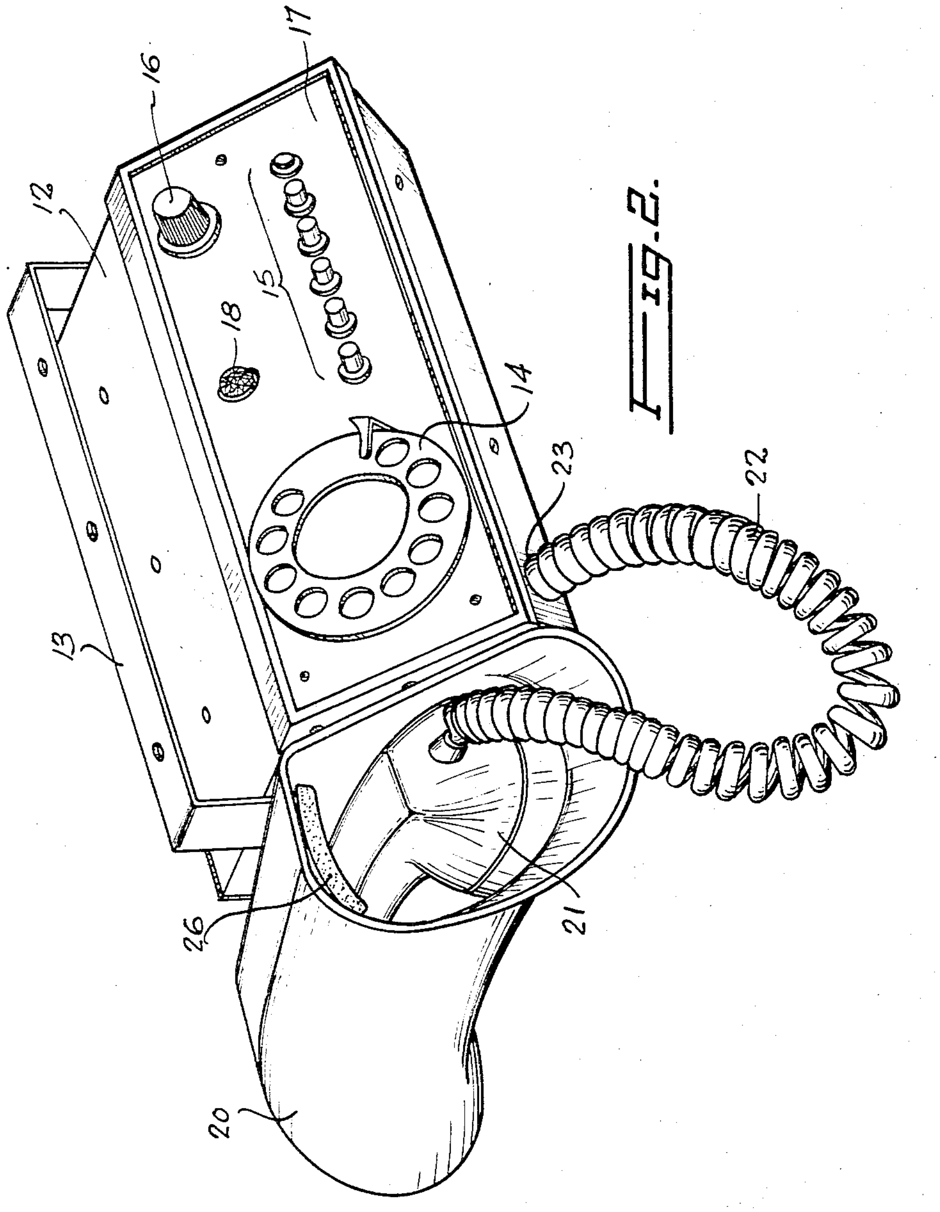
FIGURE 2 is a perspective view of the unit itself.
Figure 3:
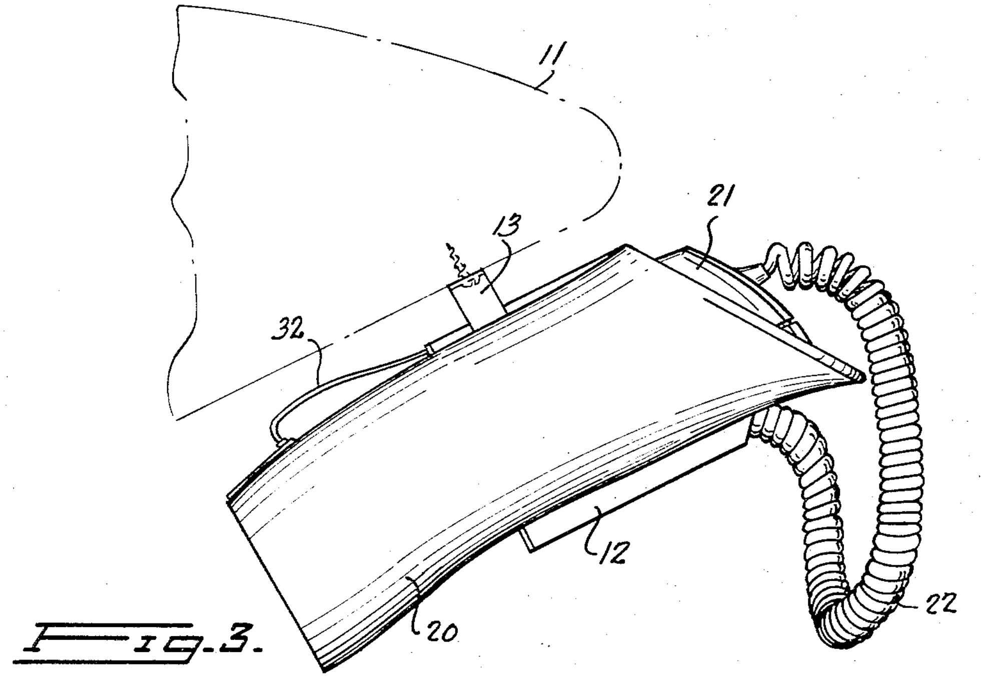
FIGURE 3 is a side view of the unit.

The unit 10 shown in FIGURE 1 is mounted beneath the dashboard 11 of an automobile at a convenient location for use either by the driver or by a passenger seated beside him. The unit 10 itself is seen in FIGURE 2, and consists of a casing 12 including a fixing bar 13 for securing to the underside of the dashboard. The casing 12 houses the necessary radio telephone transmitting/receiving equipment, control of which is exercised by a dial 14, pushbuttons 15 and a volume control 16 on the front panel 17. There is also a lamp 18 on the panel to indicate when the unit is operating.

Figure 6:
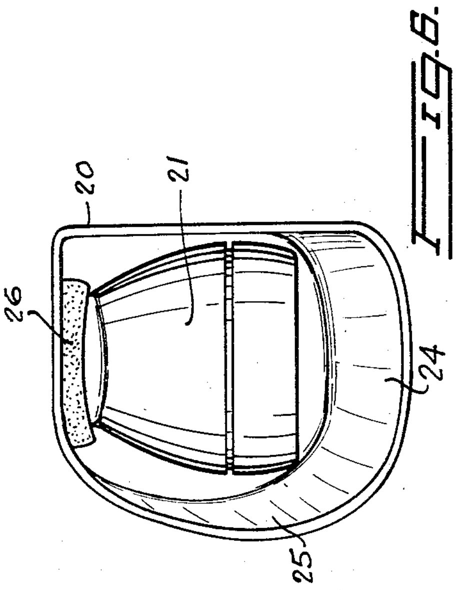
FIGURE 6 is a fragmentary front view looking into the mouth of the holder.
Figure 5:
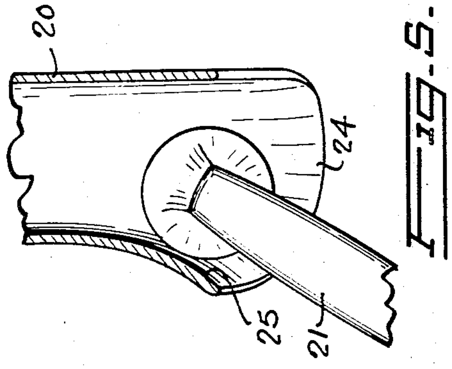
FIGURE 5 is a fragmentary, cut-away, top view of the handset and holder.

To one end of the casing 12 there is secured a tubular handset holder 20 in which a conventional handset 21 is housed, the cord 22 from the handset extending to an entry point 23 of the casing 12. As best seen from FIGURES 5 and 6, the holder 20 has a mouth which is enlarged and curved at its lower and left-hand surfaces 24 and 25 respectively. The holder 20 also has a foam rubber pad 26 secured to the underside of its upper surface near the mouth, this pad 26 pressing gently down against the handset to render the latter snuggly housed in the holder (FIGURE 4).

Figure 4:
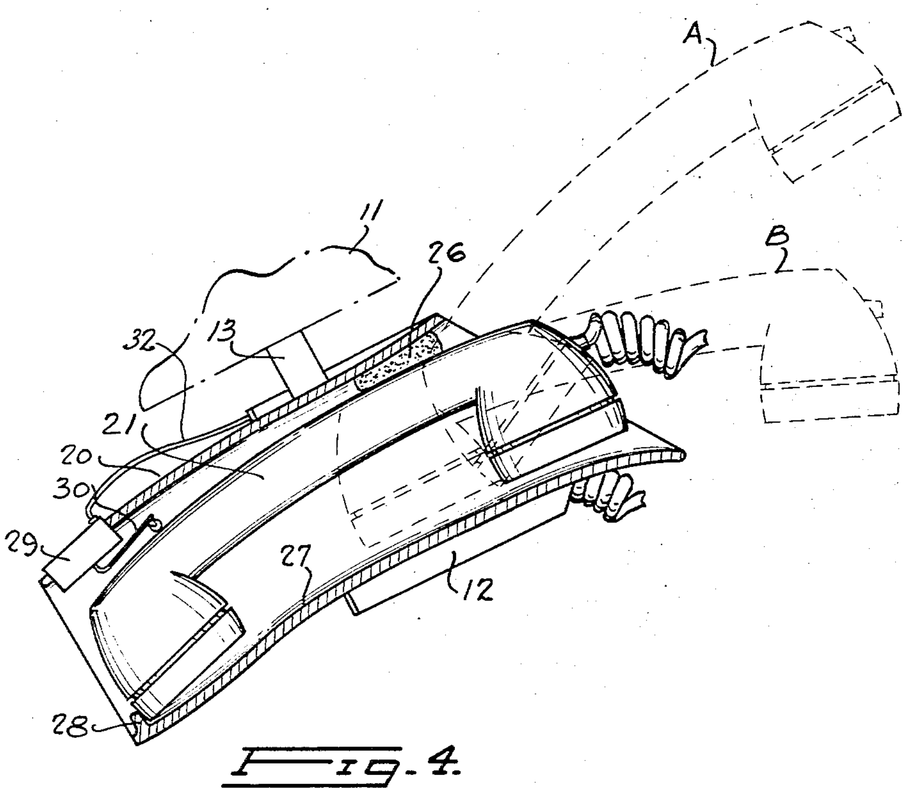
FIGURE 4 is a partly cut-away view corresponding to FIGURE 2 and demonstrating movement of a handset into and out of its holder.

As also best seen from FIGURE 4, the holder 20 is curved to conform generally to the curved shape of the handset 21. In addition to this general curvature, the undersurface of the holder 20 is formed with a hump 27 about two-thirds of the distance along the holder from the mouth to the rear thereof. The holder is open at the rear, its lower surface being formed with an upwardly projecting stop 28 which limits rearward movement of the handset 21. (The references to "rear" are related to the assembly as viewed by the driver of the automobile—the rear of the assembly is actually more forwardly situated in the vehicle itself.) A switch 29 is mounted on the rear, upper surface of the holder 20, and has an operating arm 30 that projects into the area occupied by the handset 21 to be operated thereby.

When the unit is switched on a loudspeaker is also switched on. The speaker, which may be mounted in the casing 12 or elsewhere in the vehicle independent of the casing 12, is used for receiving the "call tone" and also to enable all occupants of the car to hear the conversation. If the person receiving the call wishes to mute the speaker he presses one of the buttons 15 which acts as a mute button cutting out the speaker. On replacing the handset into the holder, the switch 29 acting through cable 32 automatically drops out the relay holding the speaker mute, enabling the central office to call the car as long as the unit is switched on, and thus eliminating the human element of manual switching. When the handset is removed there is no change to the speaker condition, since the holding relay is only actuated by the mute button.

The broken line positions A and B shown in FIGURE 4 demonstrate two of the successive positions occupied by the handset during its insertion into the holder. The reverse movement will be employed for withdrawal of the handset. The mouth surfaces 24 and 25 serve to guide the handset during initial entry into the holder.

The provision of the hump 27, combined with the general downward slope of the holder 20, serves to minimize any risk of the handset becoming accidentally dislodged as a result of vibration or movement of the vehicle. Initial outward movement of the handset involves substantial elevation of its center of gravity, and consequently accidental outward movement of the handset is strongly inhibited. This feature is nevertheless combined with ease of intentional removal. The angle of slope of the holder 20 is such that a direct outward and upward withdrawal movement of the handset by a person seated in the vehicle can be conveniently accomplished.

The structure is thus that the handset is easy to withdraw, easy to insert, firmly held in place, and not susceptible to accidental dislodgement. At the same time the handset can be located in a position in which it is readily available to a user without impeding use of the automobile's controls and without significantly restricting leg room for the occupants.

Figure 7:
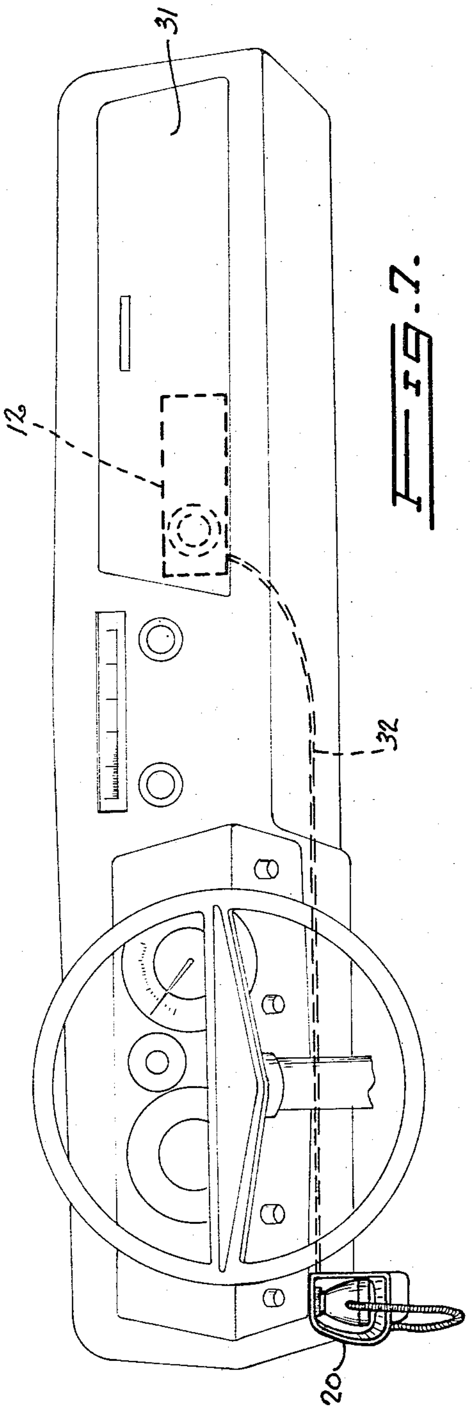
FIGURE 7 shows an alternative manner of mounting the components.

In the alternative construction of FIGURE 7 the tubular handset holder 20 is shown mounted separately from the casing 12. There may be a number of reasons why this would be convenient. For example, the handset holder may be mounted on the left-hand side of the steering column, as FIGURE 7 demonstrates, for use by a left-handed or handicapped driver. FIGURE 7 also shows the casing 12 mounted inside the glove compartment 31 of the vehicle. This location of the casing avoids it occupying space beneath the dashboard structure, and also permits the casing to be concealed, a useful feature for police work. If desired, the handset holder may also be concealed, either at the same or at a different location from the casing. Whenever the casing and handset holder are thus separated there will be provided a cable 32 extending from the equipment in the casing to the switch 29 on the holder 20, and a handset cord from the handset to such cable.

I claim:

1. A mobile telephone instrument comprising:

(a) a tubular, generally upwardly convexly curved handset holder, (b) means for mounting said holder in a vehicle in an orientation extending downwardly and rearwardly away from a user seated in the vehicle, (c) a telephone handset snuggly housed in said holder in an upright orientation, that is with the ends thereof below the arched portion interconnecting said ends, and at a location for ready grasping of its microphone end by the user for withdrawal from said holder by movement towards the user in the direction of the longitudinal extent of said handset, (d) and a hump on the lower inner surface of said holder intermediate its ends, such hump accentuating the downward and rearward slope of the inner end of the holder.

2. A mobile telephone instrument comprising (a) a casing containing transmitting/receiving telephone equipment, (b) means for securing said casing in a vehicle, (c) a tubular, generally upwardly convexly curved handset holder, (d) means for mounting said holder in a vehicle in an orientation extending downwardly and rearwardly away from a user seated in the vehicle, (e) a telephone handset snuggly housed in said holder in an upright orientation, that is with the ends thereof below the arched portion interconnecting said ends, and a location for ready grasping of its microphone end by the user for withdrawal from said holder by movement towards the user in the direction of the longitudinal extent of said handset, (f) a hump on the lower inner surface of said holder intermediate its ends, such hump accentuating the downward and rearward slope of the inner end of the holder, (g) and cable means extending from said microphone end to telephone equipment in said casing.

3. A mobile telephone instrument according to claim 2, wherein said handset holder is secured to said casing.

4. A mobile telephone instrument according to claim 2, wherein said handset holder is mounted in said vehicle at a location displaced from said casing.

5. A mobile telephone instrument according to claim 2, further comprising a switch situated at the rear of the holder, and cable means extending from said switch to telephone equipment in said casing, said switch including operating means engaging the handset for operation of the switch in one sense when the handset is fully housed and for operation thereof in the other sense when the handset is withdrawn from the holder.

6. A mobile telephone instrument according to claim 2, including a stop for limiting rearward travel of said handset in said holder.

References Cited

UNITED STATES PATENTS

| | | | |
|---|---|---|---|
| 2,615,322 | 10/1952 | Gazda | 179—100 |
| 3,102,169 | 8/1963 | Ivens | 179—100 |

KATHLEEN H. CLAFFY, *Primary Examiner.*

A. H. GESS, *Assistant Examiner.*